United States Patent [19]

Wekenmann, deceased et al.

[11] Patent Number: 5,393,567
[45] Date of Patent: Feb. 28, 1995

[54] POWDER MIXTURE FOR MAKING AN UNDERCOATING AGENT FOR STEEL SURFACES

[75] Inventors: Guido Wekenmann, deceased, late of Ludwigsburg, by Dorothee Wekenmann, Dominik Guido Wekenmann and Monika Johanna Wekenmann, heirs; Siglinde Herzog nee Kress, Kornwestheim; Axel Petrikat, Ludwigsburg, all of Germany

[73] Assignee: Sika Chemie GmbH, Stuttgart, Germany

[21] Appl. No.: 70,307

[22] PCT Filed: Oct. 25, 1991

[86] PCT No.: PCT/EP91/02023
§ 371 Date: Sep. 27, 1993
§ 102(e) Date: Sep. 27, 1993

[87] PCT Pub. No.: WO92/09663
PCT Pub. Date: Jun. 11, 1992

[30] Foreign Application Priority Data

Nov. 27, 1990 [DE] Germany .................. 4037598

[51] Int. Cl.⁶ .............. C09D 5/08; C09D 5/10
[52] U.S. Cl. ............... 427/372.2; 427/383.7; 427/388.1; 427/388.4; 106/14.05; 106/14.11; 106/14.13; 106/14.14; 106/14.21; 106/14.41; 106/14.44; 106/14.45

[58] Field of Search .......... 106/14.05, 14.11, 14.13, 106/14.14, 14.21, 14.41, 14.44, 14.45; 427/372.2, 383.1, 383.7, 384, 385.5, 388.1, 388.4; 524/434, 436

[56] References Cited

U.S. PATENT DOCUMENTS

| | | | |
|---|---|---|---|
| 3,202,517 | 8/1965 | Jarboe et al. | 106/14.44 |
| 3,849,141 | 11/1974 | Palm et al. | 106/14.21 |
| 3,907,608 | 9/1975 | Barrett et al. | 428/552 |
| 3,941,609 | 3/1976 | Stern | 106/14.44 |
| 3,954,510 | 5/1976 | Gunn et al. | 106/1.17 |
| 4,110,117 | 8/1978 | McLeod | 106/14.44 |
| 4,370,382 | 1/1983 | Salensky | 106/14.44 |
| 4,561,896 | 12/1985 | Drake et al. | 106/14.44 |
| 5,167,701 | 12/1992 | Savin | 106/14.44 |

FOREIGN PATENT DOCUMENTS

| | | |
|---|---|---|
| 2240724 | 2/1973 | Germany . |
| 2352130 | 4/1974 | Germany . |
| 2352150 | 4/1974 | Germany . |
| 2456299 | 8/1976 | Germany . |

*Primary Examiner*—Anthony Green
*Attorney, Agent, or Firm*—Flynn, Thiel, Boutell & Tanis

[57] ABSTRACT

The invention concerns a zinc-containing corrosion-protecting undercoating agent for steel surfaces. The undercoating agent, which contains no organic solvents, consists of a mixture of dry, water-emulsifiable dispersion agent in powder form and water-reactive zinc in powder or flake form which are mixed with water immediately before treatment. The corrosion-protection properties of undercoating agents prepared in this way are as good as those of prior art single-component zinc-dust undercoating agents using only organic solvents.

9 Claims, No Drawings

POWDER MIXTURE FOR MAKING AN UNDERCOATING AGENT FOR STEEL SURFACES

DESCRIPTION

The invention relates to a powder mixture for making an anticorrosive zinc-containing undercoating agent for steel surfaces.

It is known to use zinc dust and/or zinc flakes as a corrosion-inhibiting pigment in organic undercoating agents. The undercoating agents consist essentially of a synthetic resin, which is dissolved in an organic solvent to produce a soft consistency during use. Aromatic hydrocarbons, like xylol, are primarily considered as organic solvents. The undercoating agent is stored in its liquid form in closed containers and is delivered in this manner. For a specified use it is directly applied to the previously cleaned steel surface. By evaporating the solvent, the mixture hardens and forms a solid closed layer in which the zinc dust is contained in a finely distributed form. When moist air penetrates into the undercoating, mainly basic zinc carbonate ($4ZnO \cdot CO_2 \cdot 4H_2O$) forms on the zinc flakes, which results during an increase in volume and an increase in the density of the undercoating and protects the steel surface lying therebelow from destruction. A further anticorrosive effect is due to the cathodic protective action of the zinc dust pigment.

Considerable amounts of organic solvents are emitted into the surrounding air during the application of the known zinc dust undercoating agents. The thus caused environmental damage has been accepted up to now because other binding agents, for example on a water base, did not appear to be suited because of the, to be expected, chemical reaction with the zinc powder.

Starting out from this, the basic purpose of the invention is to provide a one-component powder mixture to make an undercoating agent which can be environmentally friendly produced, stored and applied, and which has still good corrosion-inhibiting characteristics.

To attain this purpose the invention suggests to first produce a mixture of a dried, water-reemulsifiable powdery dispersion agent and a water-reactive zinc in a powder or flake form and which can be stored and transported in water-tight bags.

The mixture contains advantageously a water-reemulsifiable dispersion agent from the following groups:
  a vinyl acetate copolymer, in particular, a vinyl acetate-ethylene copolymer, a vinyl acetate-vinyl ester copolymer or a vinyl acetate-vinyl laurate-vinylversatate copolymer, an acrylate, an ethylene-vinyl laurate-vinyl chloride copolymer, a styrene copolymer, in particular a styrene acrylate or a styrene butadiene.

The mixture has furthermore advantageously a powdery filler or extender from the talcum, barium sulfate and mica group and/or a preferably organic pigment, which filler or extender is actually known in the lacquer industry. These materials help to improve the corrosion-inhibiting characteristics and to adjust the desired rheology.

In order to obtain during the application an easily homogenizable mixture out of the powdery parts with water, the use of actually known additives, like wetting agents, defoamers, thixotropic agents, agents promoting the film formation, is of an advantage.

The dry mixture of the invention contains advantageously the following parts:
  1 to 30 percentage by weight of dispersion powder from the group:
    vinylacetate-copolymer, in particular vinyl-acetate-vinylester-copolymer or vinyl acetatevinyl-laurate-vinyl-versatate-copolymer acrylate ethylene-vinyllaurate-vinylchloride-copolymer
    styrene-copolymer, in particular styreneacrylate, styrenebutadiene
  70 to 99 percentage by weight of pigments/fillers consisting of:
    2 to 100% of zinc powder and/or zinc flakes
    0 to 98% of fillers like talcum ($3MgO \cdot 4SiO_2 \cdot H_2O$), barium sulfate ($BASO_4$) or mica ($K_2O \cdot 3Al_2O_3 \cdot 6SiO_2 \cdot 2H_2O$, or "PLASTORIT" types)
    the remainder: powdery additives, like defoamers, wetting agents, agents promoting film formation, thixotropic agents.

The powdery dry mixture can be stored and transported in water-proof bags. Shortly before the application, 100 parts by weight of the powdery mixture is mixed by agitation with 5 to 50 parts by weight of water. After the water preferably 20 to 30 parts by weight of water, to form a viscous coating compound has evaporated, a closed continuous coating is formed. The good corrosion-inhibiting characteristics of the coating produced in this manner permit one to conclude that the zinc powder, which is reactive with water, is extensively shielded against the reaction with water by the water-absorbing dispersion agent during the short application time.

Exemplary embodiment 1

25 parts by weight of a powdery vinylacetate-vinylester-copolymer as dispersion powder were mixed with 48 parts by weight of zinc powder, 25 parts by weight of talcum and a remainder of powdery additives forming a dry powdery mixture.

Exemplary embodiment 2

10 parts by weight of styreneacrylate as dispersion powder, 64 parts by weight of zinc flakes, 25 parts by weight of barium sulfate fillers and a remainder of powdery additive were mixed forming a dry, powdery mixture.

100 parts by weight of the dry, powdery mixtures according to the exemplary embodiments 1 and 2 were mixed by agitation with 30 parts by weight of water and were immediately thereafter applied to a cleaned steel surface as an undercoating.

After one week of drying time at a temperature of 23° C. and 50% humidity, the coated surface was subjected to the salt spray test according to DIN 50021-SS. Rusty spots, as they otherwise occur with water-based undercoating agents, were not found.

In summary, the following can be stated: The invention relates to an anticorrosive zinc-containing undercoating agent for steel surfaces which is free of organic solvents and consists of a mixture of a dried, water-reemulsifiable powdery dispersion agent and a water-reactive zinc in powder or flake form which is mixed with water immediately before treatment. The undercoating agent produced in this manner has corrosion-inhibiting characteristics which are just as good as the known single-component zinc-dust undercoating agents exclusively dissolved in organic solvents.

We claim:

1. A powder mixture for making an anticorrosive zinc-containing undercoating agent for steel surfaces, comprising a dry mixture of a water-reemulsifiable powdery dispersion agent and a water-reactive zinc in powder or flake form said dispersion agent being selected from the group consisting of a vinyl acetate copolymer, an acrylate, an ethylene-vinyl laurate-vinyl chloride copolymer and a styrene copolymer.

2. The powder mixture according to claim 1, wherein the dispersion agent is selected from the group consisting of:

a vinyl acetate-ethylene copolymer, a vinyl acetate-vinyl ester copolymer, a vinyl acetate-vinyl laurate-vinyl versatate copolymer, styrene acrylate and styrene butadiene.

3. The powder mixture according to claim 1, wherein the mixture contains at least one powdery filler selected from the group consisting of talcum, barium sulfate, mica and an organic pigment.

4. The powder mixture according to claim 1, wherein the mixture additionally contains at least one powdery additive selected from the group consisting of a defoamer, a wetting agent, a thixotropic agent, and a film formation promoting agent.

5. The powder mixture according to claim 1, wherein said dry mixture comprises:

1 to 30 percent by weight of the dispersion agent and 70 to 99 percent by weight of pigments/fillers selected from the group consisting of 2 to 100% of at least one of zinc powder and zinc flakes, 0 to 98% of a filler selected from the group consisting of talcum, barium sulfate and mica and the remainder being at least one powdery additive selected from the group consisting of a defoamer, a wetting agent, an agent promoting film formation and a thixotropic agent.

6. A method for the manufacture and application of an anticorrosive undercoating agents for steel surfaces comprising the steps of mixing the powder mixture according to claim 1 with water to form a viscous coating compound, applying the coating compound immediately thereafter to a steel surface and drying the compound by evaporating the water.

7. The method according to claim 6, wherein 5 to 50 parts by weight of water are mixed with 100 parts by weight of a powder mixture.

8. A method of making an anticorrosive undercoating agent comprising the step of mixing water with the powder mixture of claim 1 to form a viscous coating compound.

9. The method according to claim 8, wherein 5 to 50 parts by weight of water are mixed with 100 parts by weight of the powder mixture.

* * * * *